United States Patent
Cirulli et al.

(10) Patent No.: US 7,155,403 B2
(45) Date of Patent: Dec. 26, 2006

(54) SYSTEM AND METHOD FOR LEVERAGING PROCUREMENT ACROSS COMPANIES AND COMPANY GROUPS

(75) Inventors: Susan Bumgardner Cirulli, Endicott, NY (US); Robert Martin Evans, Binghamton, NY (US); Gerald R. Robinson, Horseheads, NY (US); Sherry Lee Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/815,312

(22) Filed: Mar. 22, 2001

(65) Prior Publication Data

US 2002/0138281 A1 Sep. 26, 2002

(51) Int. Cl.
*G06Q 99/00* (2006.01)
(52) U.S. Cl. ............................. 705/17; 705/64; 705/67; 705/30
(58) Field of Classification Search .................. 705/67, 705/30, 64
See application file for complete search history.

(56) References Cited

U.S. PATENT DOCUMENTS

| 5,799,151 A | 8/1998 | Hoffer ................... 395/200.34 |
| 2004/0015367 A1* | 1/2004 | Nicastro et al. ................ 705/1 |
| 2005/0097016 A1* | 5/2005 | Barnard et al. ................ 705/30 |

* cited by examiner

*Primary Examiner*—Firmin Backer
(74) *Attorney, Agent, or Firm*—William E. Schiesser; Shelley M Beckstrand

(57) ABSTRACT

A leveraged procurement network (LPN) system for leveraging purchasing across company and company groups includes a front-end requisition and catalog system accessible by users from a plurality of companies in different company groups. Access to procurement resources is controlled by user profiles and resource profiles specifying for each user and resource the applicable company group. Purchases against volume specific contracts are leveraged by requisitions for a plurality of company groups, while user access to procurement resources within the front-end system are controlled by company and/or company group.

2 Claims, 10 Drawing Sheets

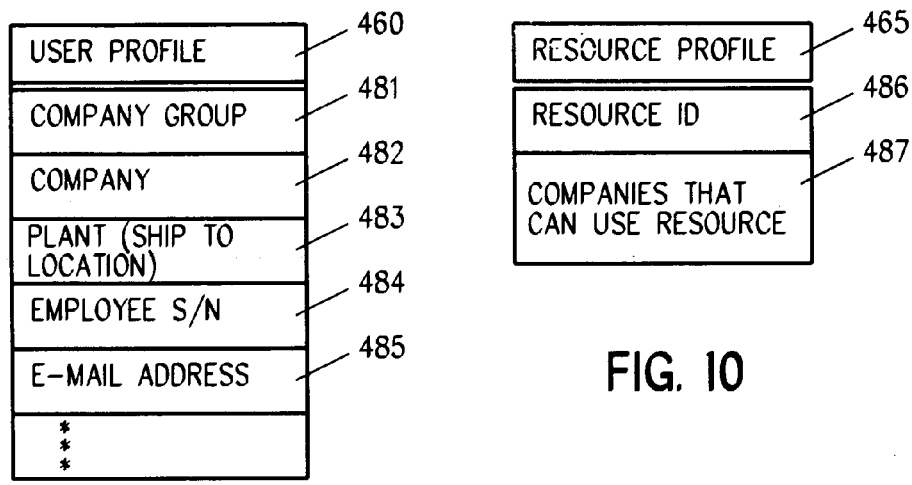
FIG. 9
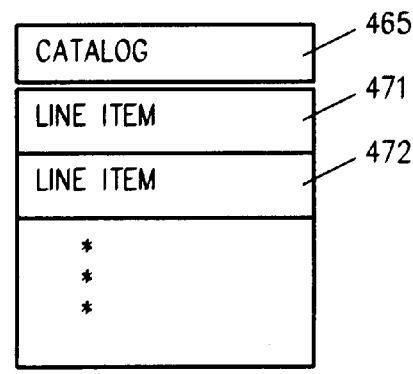
FIG. 10
FIG. 11

SYSTEM AND METHOD FOR LEVERAGING PROCUREMENT ACROSS COMPANIES AND COMPANY GROUPS

CROSS REFERENCE TO RELATED APPLICATIONS

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End B,iisiness Logic and Validation";

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend";

Ser. No. 09/656,803, filed 7 Sep. 2000, entitled "System and Method f or Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files";

Ser. No. 09/657,195, filed 7 Sep. 2000, entitled "System and Method for Providing an Application Navigator Client Menu Side Bar";

Ser. No. 09/819,462, filed 28 Mar. 2001, entitled "SYSTEM AND METHOD FOR AUTOMATING INVOICE PROCESSING WITH POSITIVE CONFIRMATION";

Ser. No. 09/815,318, filed 22 Mar. 2001, entitled "SYSTEM AND METHOD FOR GENERATING A COMPANY GROUP USER PROFILE".

Ser. No. 09/819,437, filed 28 Mar. 2001, entitled "SYSTEM AND METHOD FOR SHARING DATA ACROSS FRAMES USING ENVIRONMENT VARIABLES";

Ser. No. 09/815,317, filed 22 Mar. 2001, entitled "SYSTEM AND METHOD FOR SYNCHRONIZING LEDGER ACCOUNTS BY COMPANY GROUP";

Ser. No. 09/815,320, filed 22 Mar. 2001, entitled "SYSTEM AND METHOD FOR GROUPING COMPANIES ACCORDING TO ACCOUNTING SYSTEM OR RULES";

Ser. No. 09/815,316, filed 22 Mar. 2001, entitled "SYSTEM AND METHOD FOR FRAME STORAGE OF EXECUTABLE CODE"; Ser. No. 09/815,313, filed 22 Mar. 2001, entitled "SYSTEM AND METHOD FOR INVOICE IMAGING THROUGH NEGATIVE CONFIRMATION PROCESS";

Ser. No. 09/816,264, filed 23 Mar 2001, entitled "SYSTEM AND METHOD FOR PROCESSING TAX CODES BY COMPANY GROUP"; and Ser. No. 09/798,598, filed 2 Mar. 2001, entitled "SYSTEM AND METHOD FOR MANAGING INTERNET TRADING NETWORKS".

The above-identified patent applications are incorporated herein by reference.

BACKGROUND OF THE INVENTION

1. Technical Field of the Invention

This invention pertains to a requisition and catalog system. More particularly, it relates to a leveraged procurement network (LPN) system for leveraging purchasing across company and company groups.

2. Background Art

Previously, an enterprise company provided procurement services to a customer company. The back end system for supporting these procurement services is bridged to a front end requisition and catalog system (Req/Cat Web, or RCW server) with which users from the customer company would interface to view a catalog of commodities and/or services and enter requisition requests.

When the enterprise company provides such procurement services to more than one customer company, it has heretofore been required to rewrite the front end system to accommodate the accounting rules required to support the procurement activities of each additional company. This is time consuming and complex. There is, therefore, a need in the art to provide a system and method whereby an enterprise may provide procurement services to a plurality of customer companies using the same front end requisition and catalog system for them all.

However, the data and accounting for one customer company must be isolated from viewing or use by other customer companies.

The Internet provides exchange mechanisms where suppliers bring goods and services to be offered and malls for shoppers to obtain them. These exchange mechanisms are largely independent with a single company selling and an individual from another company shopping. Generally, if companies wish to partner to gain advantage either from consolidating purchase volumes to obtain better prices or from creating a complete palette of business goods and services to establish a 'one stop shop', many individual relations are established and managed independently. Manual integration of systems to ensure members rights and responsibilities are met increase the bureaucracy and paperwork. Should a company endeavor to participate or host multiple trading networks, the membership management becomes very difficult.

There is, therefore, a need in the art for a system and method whereby an enterprise may leverage purchases by a plurality of customer companies for which it is providing procurement services against a common contract having volume specific terms and conditions.

It is an object of the invention to provide an improved system and method for procuring goods and services on behalf of customer companies.

It is a further object of the invention to provide a system and method for leveraging purchases of goods and services against the same volume specific contract by a plurality of unrelated customer companies.

It is a further object of the invention to provide a system and method for providing procurement services to a plurality of companies organized according to groups of related companies sharing access to selected resources across company groups and access to other resources only within company groups.

It is a further object of the invention to provide a system and method for leveraging purchasing across company groups while isolating information to individual company groups.

SUMMARY OF THE INVENTION

A system and method for providing procurement services to a plurality of customer companies, the method including the steps of establishing a user profile for each person authorized by a customer company to access procurement services; associating each company with a company group of related companies; the user profile specifying for each user a user company and company group; providing for each procurement resource to be shared among users a resource profile specifying for each resource those companies to have access to the procurement resource; and responsive to the user profile and resource profiles, controlling user access to the procurement resources.

In accordance with an aspect of the invention, there is provided a computer program product configured to be operable for providing procurement services to a plurality of customer companies.

Other features and advantages of this invention will become apparent from the following detailed description of the presently preferred embodiment of the invention, taken in conjunction with the accompanying drawings.

BRIEF DESCRIPTION OF THE DRAWINGS

FIG. 9 is a diagram illustrating the content of a user profile.

FIG. 10 is a diagram illustrating the content of a resource or process profile.

FIG. 11 is a diagram illustrating the content of a catalog.

BEST MODE FOR CARRYING OUT THE INVENTION

In accordance with the preferred embodiments of the invention, a front end order system, such as a procurement catalog and requisition system, is enabled to accommodate multiple business with complex accounting rules while providing secure information viewing in support of those businesses and their processes. Companies having common ownership, and therefore similar accounting systems, are grouped in procurement coalitions for volume discounts or access to shared contracts. Such contracts and other resources may also be leveraged across company groups.

Figure 1:
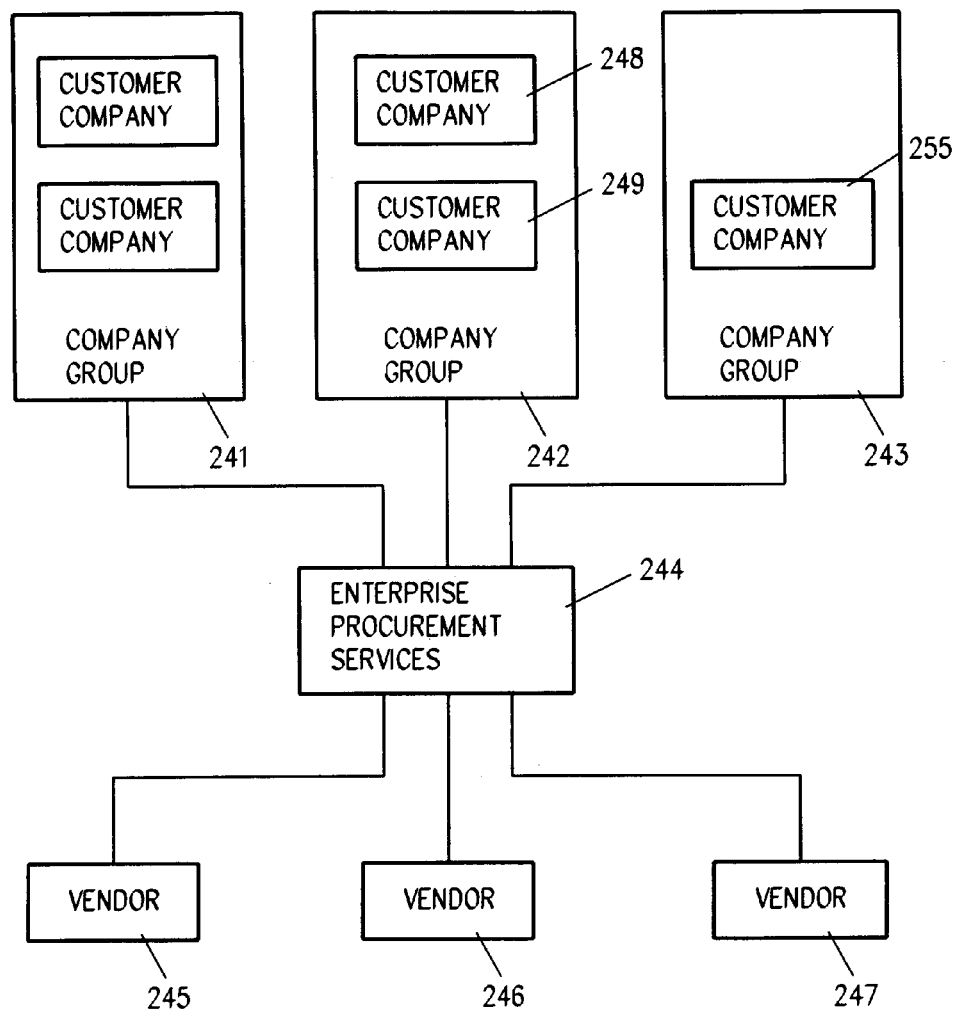
FIG. 1 is a high level system diagram illustrating an enterprise system for providing procurement services with respect to a plurality of vendors on behalf of a plurality of company groups of related customer companies in accordance with the preferred embodiment of the invention.

Referring to FIG. 1, the procurement services organization of an enterprise 244 provides procurement services to a plurality of companies 248, 249 organized in a plurality of company groups 241–243 with respect to a plurality of vendors 245–247.

Figure 2:
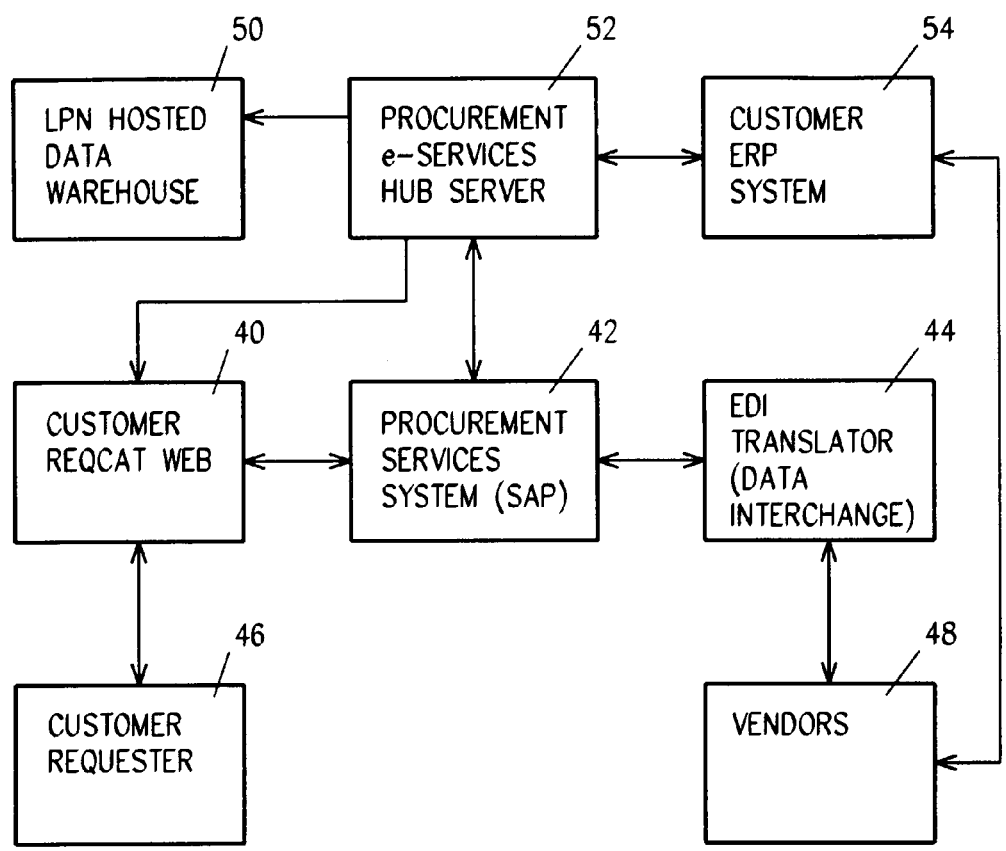
FIG. 2 is a high level system diagram illustrating the LPN application architecture of the preferred embodiment of the invention.

Referring to FIG. 2, the architecture of system components administered by enterprise 244 includes a customer requisition and catalog (ReqCatWeb, or RCW) system 40, an enterprise procurement services system (SAP) 42, an enterprise data interchange, or EDI translator system 44, an enterprise (LPN) hosted data warehouse 50, an enterprise procurement hub server 52. Also illustrated in FIG. 2 are a customer requester web terminal 46 and vendors 48.

ReqCatWeb 40 is a front-end interface between the user and the procurement system, providing access to catalogs and commodities, to order the day-to-day items required for the business.

SAP 42 is the back-end purchasing engine of the enterprise, such as is supported by IBM, accepting the requisitions from the front-end ReqCatWeb 40, and generating EDI transactions, as well as the accounting transactions for the requisitions, etc.

EDI (Electronic Data Interchange) 44 is an application that interacts with suppliers by sending standardized transactions for purchase orders, receiving invoices, etc.

LPN Hosted DataWarehouse 50 is a data-warehouse facility for storing all transactions that occur in the system; used as a tool for monitoring transactions and gathering statistics.

Hub Server 52 is a back-end processing server for transferring data between elements (that is, servers) of the system.

Customer ERP System 54 is a back-end purchasing system as supported by the customer.

Figure 3:
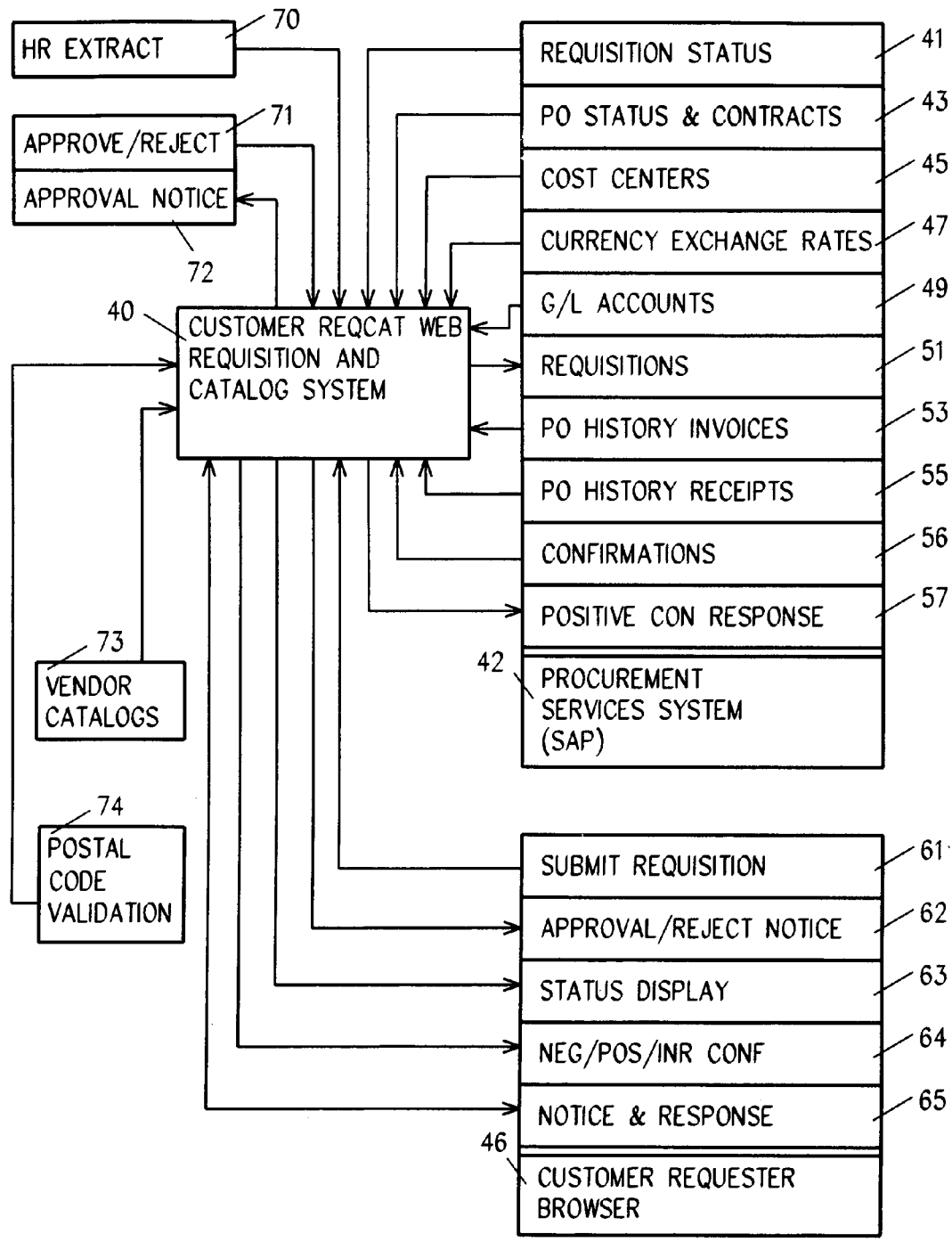
FIG. 3 is a diagram illustrating the inputs and outputs of the customer requisition catalog (RCW) component of the architecture of FIG. 2.

Referring to FIG. 3, the inputs to customer RCW system 40 from procurement services system 42 include requisition status 41, purchase order (PO) status and contracts 43, cost centers 45, currency exchange rates 47, general ledger (G/L) accounts 49, PO history invoices 53, PO history receipts 55, and confirmations 56. The outputs from customer RCW system 40 to procurement services system 42 include requisitions 51 and positive confirmation responses 57.

The inputs to customer RCW system 40 from a customer requester browser 46 include submit requisition, and outputs from system 40 to browser 46 include approval/rejection notice 62, status display 63, and negative/positive/INR confirmation. Notice and response data 65 is exchanged between RCW system 40 and browser 46.

Other inputs to RCW system 40 include vendor catalogs 73 from vendors 245–247 via enterprise EDI translator 44, postal code validation data 74 from an enterprise RCW system (not shown), and human resource extract data 70 from enterprise hub server 52. RCW system 40 also provides approval notices 72 and receives approve/reject data 71 with respect to customer approvers.

Figure 4:
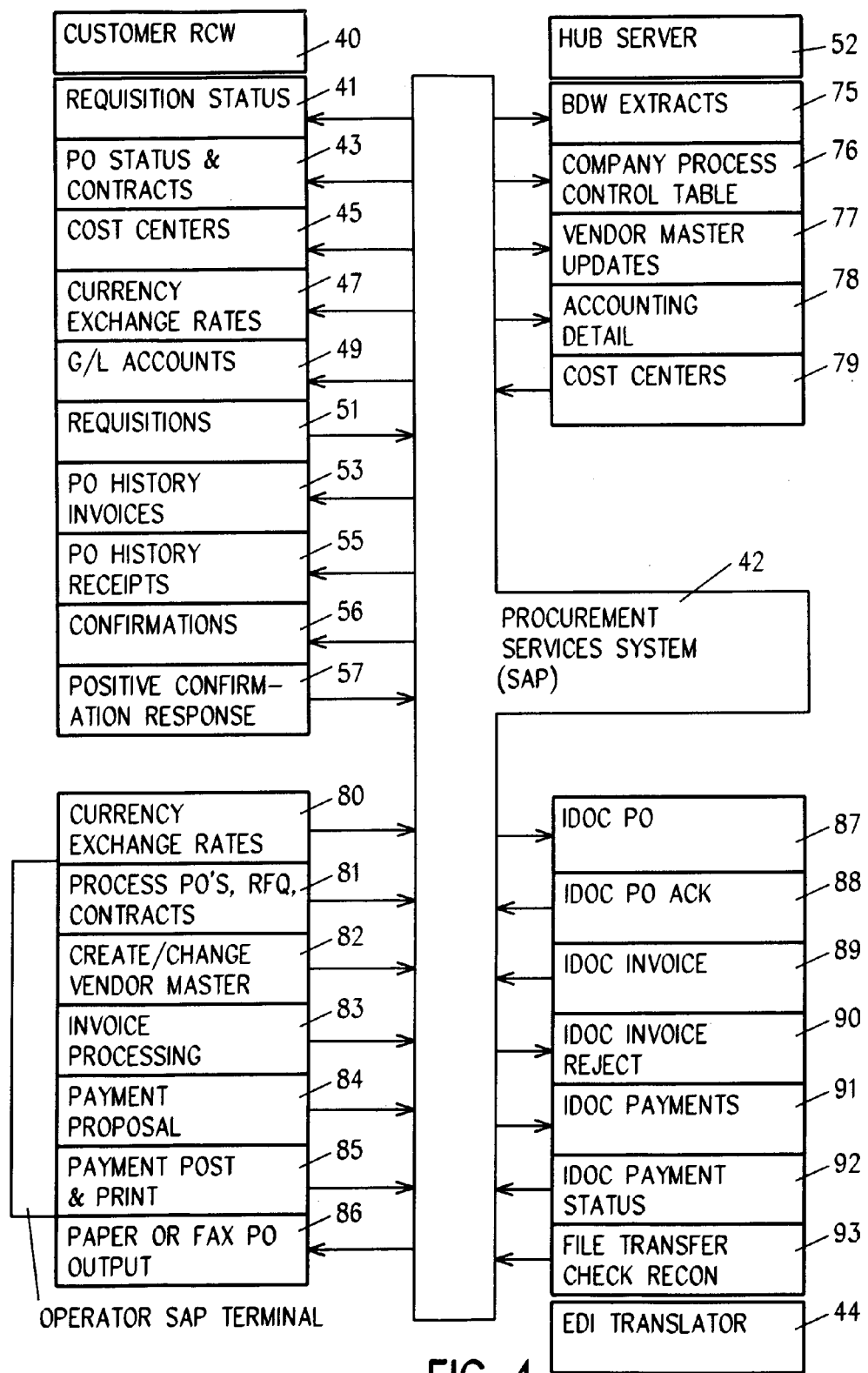
FIG. 4 is a diagram illustrating, inter alia, the inputs and outputs of the enterprise EDI translator 44 of the architecture of FIG. 2.

Referring to FIG. 4, enterprise procurement services system 42 receives as inputs from customer RCW system 40 requisitions 51 and positive confirmation responses 57, and provides to customer RCW system 40 requisition status data, purchase order status and contracts data 43, cost center data 45, currency exchange rates 47, G/L accounts 49, PO history invoices 53, PO history receipts 55, and confirmations 56.

Inputs to procurement services system 42 from hub server 52 include cost center data 79, and outputs to hub server 52 include BDW extracts, company process control table 76, vendor master updates 77, and accounting detail 78.

Inputs to procurement services system 42 from enterprise EDI translator 44 include IDOC PO acknowledgment 88, IDOC invoices 89, IDOC payment status 92 and file transfer check reconstruction 93. Outputs to EDI translator include IDOC PO 87, IDOC invoice rejection 90 and IDOC payments 91.

Inputs to enterprise procurement services system 42 from SAP operator terminals include process PO's, RFQ, and contracts data 81, create/change vendor master data 82, invoice processing 83 (which is one input to a general procurement invoicing function within procurement services system 42), payment proposal data 84, and payment post and print 85. Also input to procurement services system 42 is currency exchange rate data 80 from an external financial services server (not shown) via an enterprise currency exchange rates server (not shown), and output from procurement services system 42 to vendors 48 are paper or fax PO documents 86.

Figure 5:
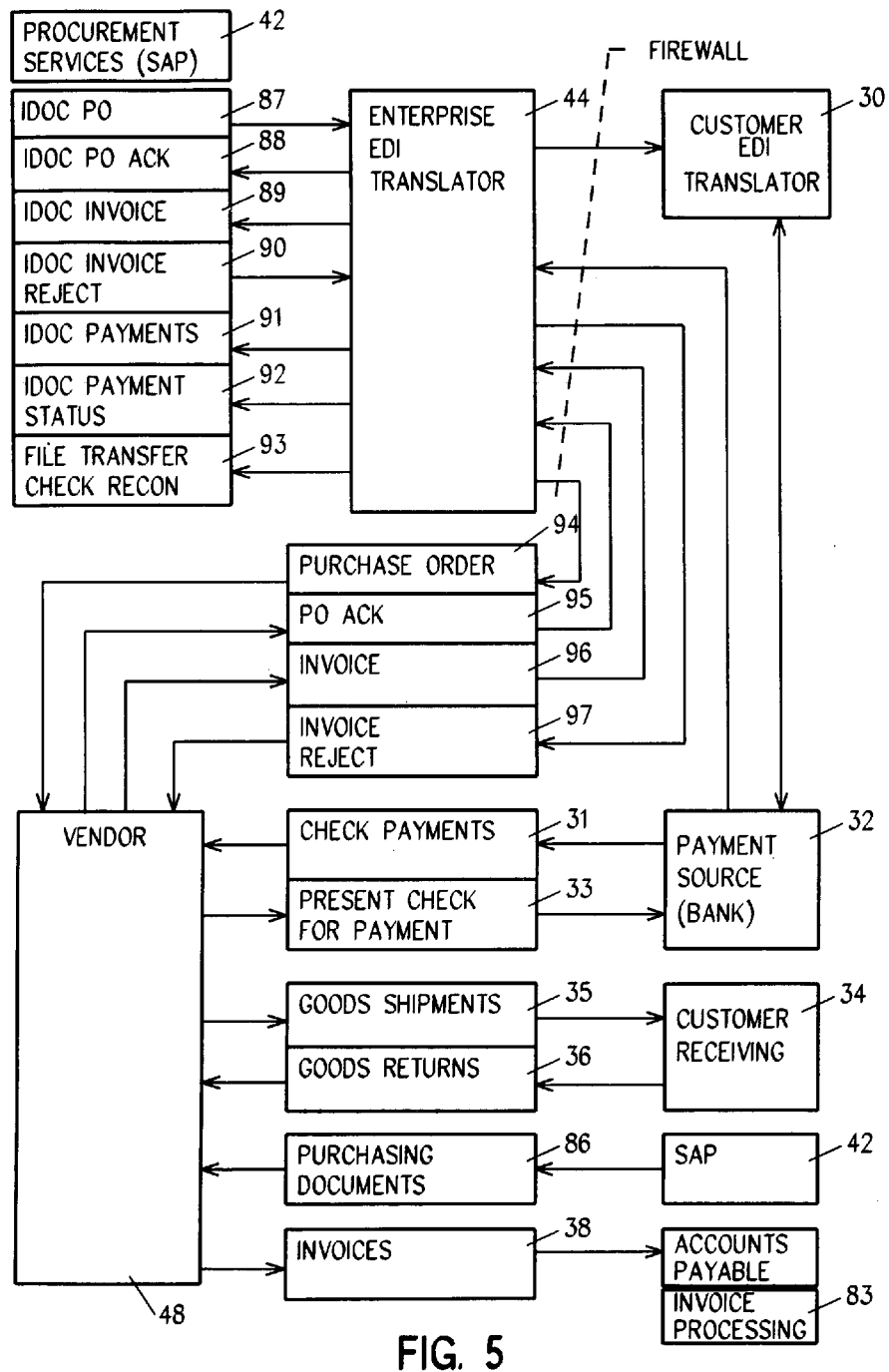
FIG. 5 is a diagram illustrating the inputs and outputs of the enterprise procurement services system 42 of the architecture of FIG. 2.

Referring to FIG. 5, inputs to enterprise EDI translator 44 from procurement services system 42 include IDOC PO 87 and IDOC invoice reject 90, and outputs to SAP system 42 include IDOC PO acknowledge 88, IDOC invoice 89, IDOC payments 91, IDOC payment status 92 and file transfer check reconstruction 93.

Inputs to enterprise EDI translator 44 from vendor 48 include PO acknowledge 95 and invoice 96, and outputs to vendor 48 include purchase order 94 and invoice reject 97. EDI translator also receives payments 32 from source 32 and provides payments to customer EDI translator 30. Bank 32 provides cashed checks and payment status to EDI translator 44. Vendor 48 provides goods shipments 35 to customer receiving 34, and receives back goods returns 36. Vendor 48 receives paper or fax purchasing documents 37 from SAP 42, and provides paper invoices 38 to enterprise accounts payable for invoice processing 83 at SAP 42.

Figure 6:
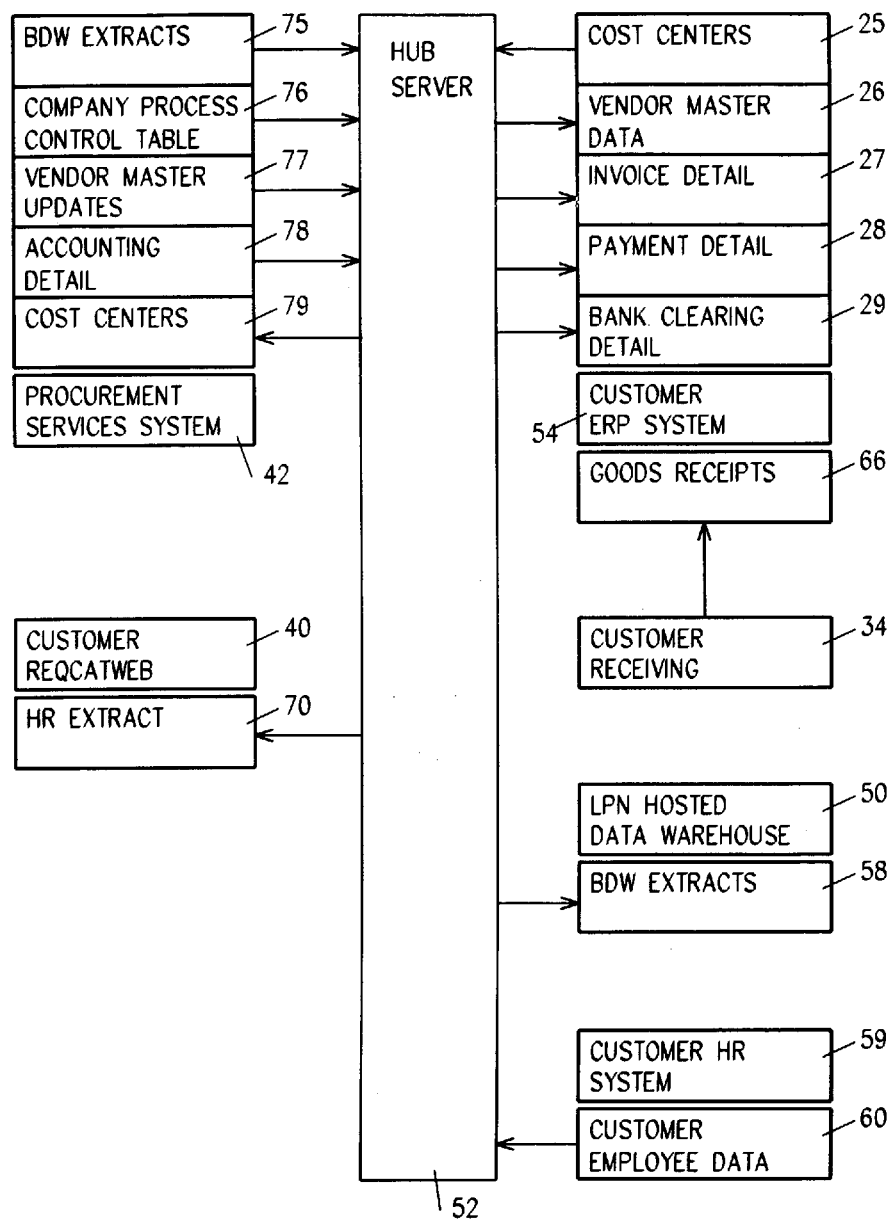
FIG. 6 is a diagram illustrating the inputs and outputs of the enterprise procurement services hub server 52 of the architecture of FIG. 2.

Referring to FIG. 6, enterprise procurement services hub server 52 receives as inputs from procurement system 42 BDW extracts 75, company process control table 76, vendor master updates 77 and accounting detail 78, and provides cost centers data 79 (which it receives from customer ERP system 54.) Hub server 52 provides human resource extract data 70, extracted from customer employee data 60, to customer RCW system 40.

Hub server 52 provides to customer ERP system 54 vendor master data 26, invoice detail 27, payment detail 28 and blank clearing detail data 29, and receives cost centers data 25. Customer ERP system 54 also receives goods receipts 66 from customer receiving 34.

Hub server 52 provides BDW extracts 58 to data warehouse 50.

The operation and inter relationships of elements of the architecture of FIGS. 2–6 pertinent to the present invention will be described hereafter in connection with preferred and exemplary embodiments of the systems and methods of the invention.

In accordance with the preferred embodiments of the invention, a front end order system, such as a procurement catalog and requisition system 40, is rendered enabled to accommodate multiple businesses 248, 249 with complex accounting rules while providing secure information viewing in support of those businesses and their processes. Companies having common ownership, and therefore similar accounting systems, are grouped in procurement coalitions 242 for volume discounts and access to shared contracts. Procurement contracts may also be leveraged across company groups 243, 242.

Both leveraging access and maintaining isolation of data is done by identifying a user at log on as associated with a company group. That association then dictates what the user can see and do.

With respect to catalogs, for example, a vendor sends his catalog in across the firewall to the EDI electronic data interchange. The RCW application loads it into the catalog. Users can come in to RCW, authorized by their user profile, from several company groups using common catalog—none knowing that the other uses it or has access to knowledge of requisitions applied against its line items. SAP assembles requisitions from all these users, and cuts purchase orders periodically for those requisitions from the same company group. By identifying those requisitions to a particular contract, volume specific terms and conditions, for example, are leverage on behalf of the companies and company groups. Catalogs are, in the preferred embodiment, controlled at the company level because this allows easier support of regional catalogs.

With respect to accounting, by driving accounting by company group, a user in one company within the company group may, for example, charge purchase to a user account in another company within the same company group.

Figure 7:
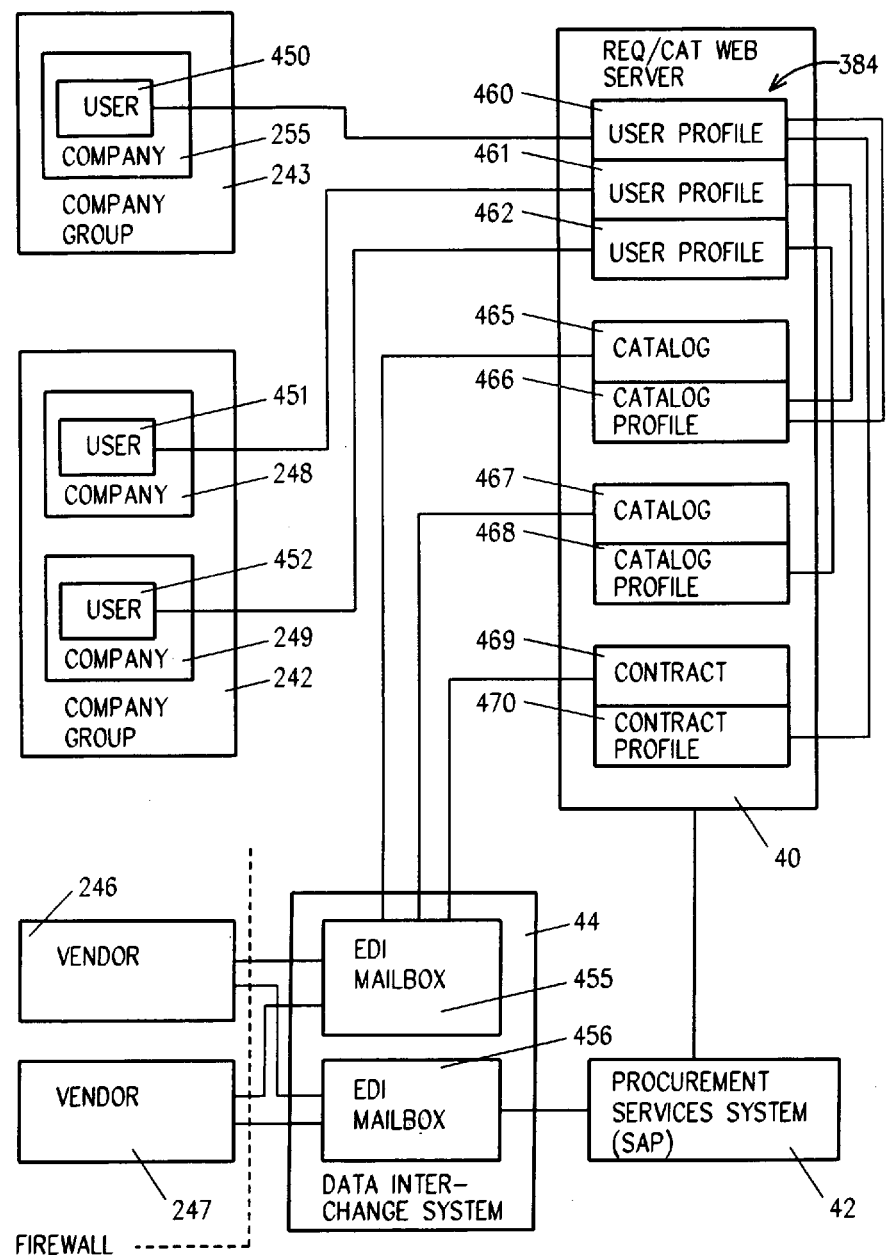
FIG. 7 is a diagram illustrating the use of user profiles and resource and process profiles in accordance with the preferred embodiment of the invention.

Referring to FIG. 7, the system of the preferred embodiment of the invention includes a plurality of companies 450–452 which are associated in company groups 242 and 243, requisition and catalog system 40, and procurement services system (SAP) 42. Associated with this system is a data interchange system 44, one of several possible communication paths with a plurality of vendors 246, 247. A company group may include one or more companies. Data interchange system 44 includes mail boxes 455, 456.

Users 450–452 are persons authorized by their respective companies to access requisition and catalog system 40. Requisition and catalog system 40 includes a user profile table 384 and a plurality of resources, shown here as catalogs 465, 476 and contract 469. Other examples of such resources include cost centers (that is, departments that can be charged), general ledger (G/L) account codes (that is, chart of accounts (COA)), user profile table 384 entries, business rules and defaults (such as those affiliated with accounting, specifying the fields that must be completed, for example, in creating a requisition and default data to be entered in those fields). All of these are generically referred to as procurement resources, and include process requirements and data resources accessible only to those users identified in their profiles as members of a particular company and, therefore, company group. (A company code will have a company group code associated with it.)

Referring to FIG. 9, user profile 384 includes, for each user, company group code, company code, plant code (that is, ship to location), employee serial number, E-mail address, and much more (not pertinent to the present invention.)

Figure 8:
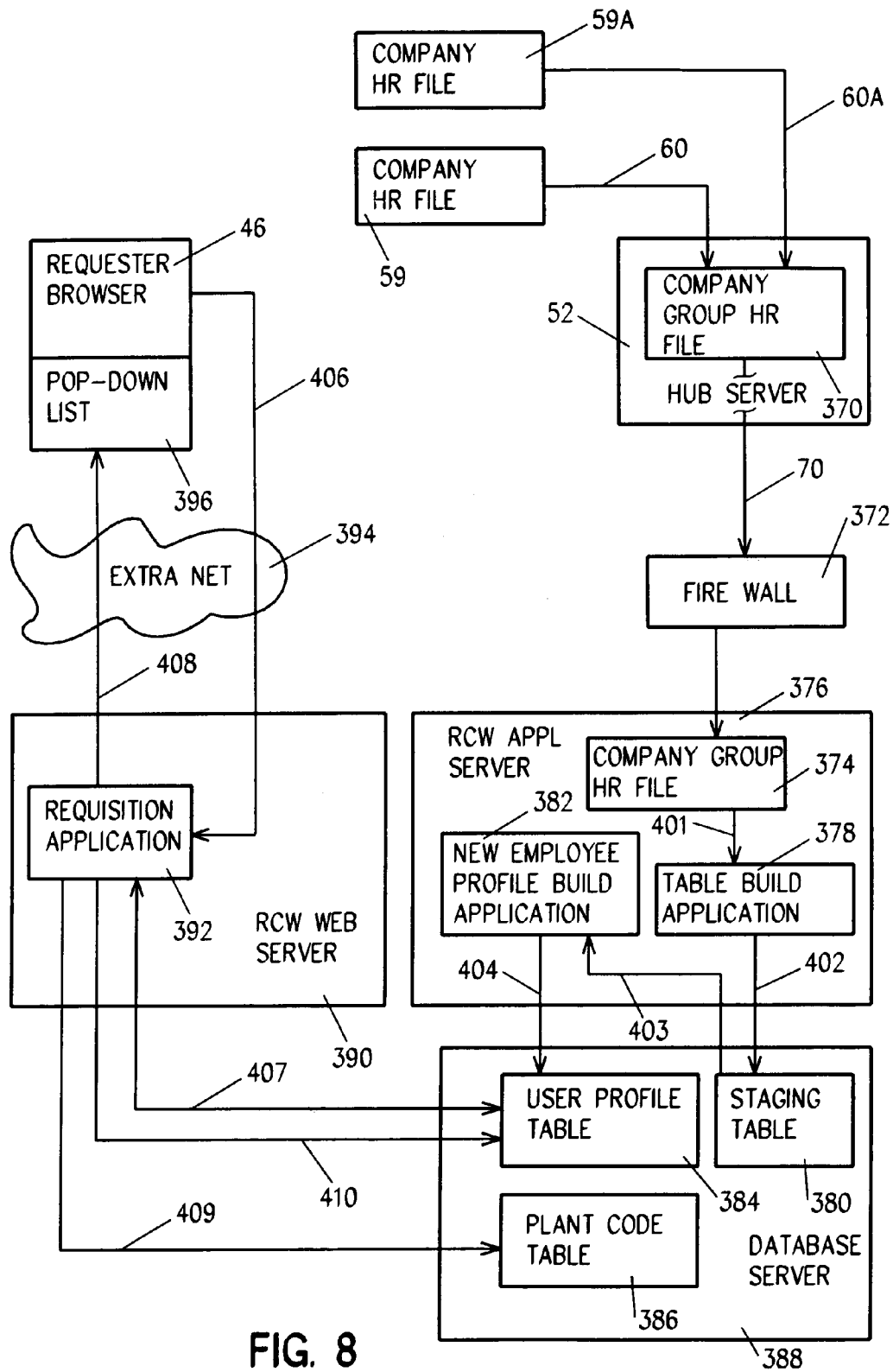
FIG. 8 is a diagram illustrating the creation and maintenance of a user profile.

Referring to FIG. 8, an exemplary system for creating and maintaining user profile table 384 is shown. A plurality of related companies 59, 59A are connected to a hub server which includes a company group human resources file. Hub server is connected through firewall 372 to a requisition and catalog (ReqCatWeb, or RCW) application server 376. RCW server 374 includes a company group HR file, a staging table build application 378 and a new employee profile build application 382 for building employee profile table 384. Applications 402, 404 are logically connected to database server 388, which includes staging table 380, user profile table 384, and plant code table 386.

Connected to an RCW web server 390 deployed to customer companies through extra net 394 is a browser operable by a user for accessing a catalog (not shown) maintained by the enterprise, and for submitting to the enterprise requisitions for purchase of commodities and services against the accounts of a customer company. In exemplary embodiment, extra net 394 may be a secure network, such as a frame relay network connection, or a secure protocol on the world wide web.

The method for creating and maintaining user profile table 384 is further described in copending application Ser. No. 09/815,318, filed Mar. 22, 2001.

Referring to FIG. 10 in connection with FIG. 7, associated with each company group resource 465, 467, 469 is a resource profile 466, 468, 470, respectively, containing a list, in the case of a catalog profile 466, of those companies, each associated with a company group, authorized to access catalog 465. This list may be maintained also at an item 471, 472 level.

As a user 451 logs in, his profile 461 code fields 482 and 481, respectively, will associate him with a given company 248 in a company group 242. When he clicks on shop-from-a-catalog button on his browser, catalog application code displays only those catalogs 465, 467 for which the profile 466, 468 includes his company in list 487 (this is at company level).

Other data that is similarly protected (other than catalogs), for example, include contracts 469, cost centers (departments that can be charged—a user can charge across companies 248, 249 in a company group, but not across company groups 243, 242), user profiles 384 (a user 451 may be able to initiate requests for other users 452—using button "change requester", which will bring up people in his company group, if configured to allow it.) More examples of resources protected by resource profiles 465 are accounting GL accounts codes that are associated with commodity codes by company group. Business rules associated with that accounting that are company group specific—and include accounting business rule defaults, such as fields required to be filled out based on what is being bought.

A given catalog 465 may, as controlled by catalog profile 466, be associated with more than one company within more than one company group. Business rules may require a user in a particular company group to buy from a particular catalog or catalogs, and such user will only see those catalogs associated with his company group. Information and resources are isolated to users by company group by associating company group with each data item that exists in the various data files and code procedures (for which such isolation is required).

Vendors 246, 247 may transmit catalog information to their respective catalogs 467, 469 via EDI mailbox 455.

Req/Cat Web server 40 assembles requisitions from users in all company groups and transfers these to procurement services system 42, which issues purchase orders to vendors 246, 247 for orders against their catalog. Invoices back from vendors 246, 247 are sent, in this example, back to SAP 42 via EDI 44 mailbox 456.

Figure 12:
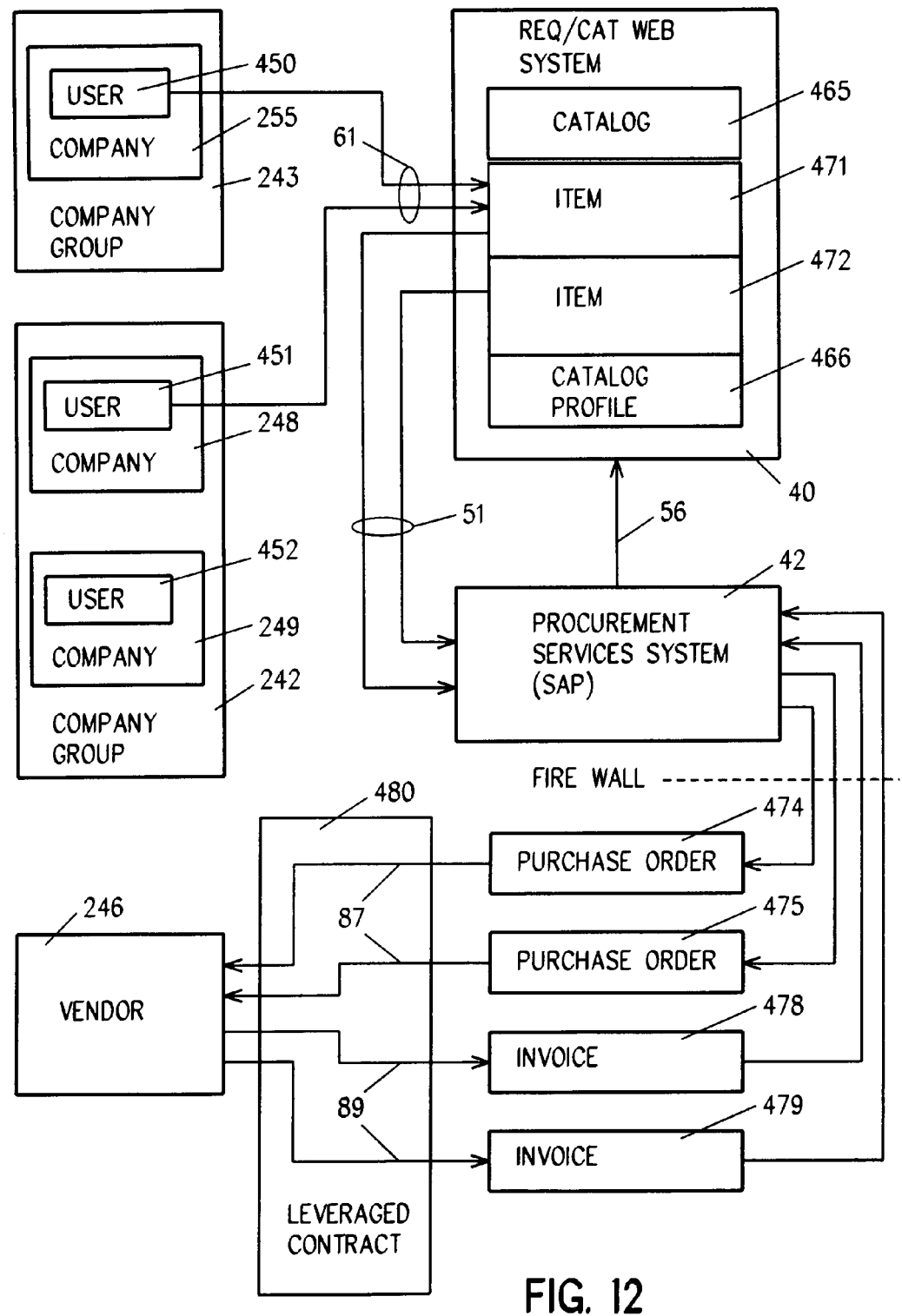
FIG. 12 is a diagram illustrating the leveraging of contract purchases across company groups.

Referring to FIG. 12, the manner in which purchases from users in different company groups are leveraged to achieve volume related costs with respect to leveraged contract 480 is described. As is represented by lines 61, users 450, 451 from different company groups may, in accordance with user profiles and catalog profile 466, as previously discussed, issue requisition requests against the same line item 471 in catalog 465. Other requests may be entered with respect ot other items 472. These requisition requests are transferred, as represented by lines 51, to SAP 42. SAP 42 periodically (say, hourly or daily) cuts purchase orders 474, 475 to vendor 246, with separate purchase orders for requisition requests from each company group. Invoices 478, 479 are returned to SAP 42 and bridged to RCW 40 for confirmation processing prior to payment. Negative or positive confirmation processing is executed by Req/Cat Web server, as is more fully described in copending application Ser. Nos. 09/815,318, filed Mar. 22, 2001, and 09/815,313, filed Mar. 22, 2001, respectively, with separate confirmation requests sent to users in different company groups—this, again, providing information segregation and protection. However, volume commitments against contract 480 are leveraged by purchase orders from all company groups having access to items in vendor 246 catalog 465.

Similarly, buys against contract 469 (for example, a blanket purchase order for services from a vendor 247) may be leveraged by company group.

In this way, the preferred embodiments of the invention isolate information and processing required across multiple company groups by using profiles (user profile and resource and process profiles such as contract and catalog profiles). There is a profile provided for every element, resource, procedure, data, line item, G/L account—everything of any kind for which leveraging and isolation is to be achieved across company groups.

ADVANTAGES OVER THE PRIOR ART

It is an advantage of the invention that there is provided an improved system and method for procuring goods and services on behalf of customer companies.

It is a further advantage of the invention that there is provided a system and method for leveraging purchases of goods and services against the same volume specific contract by a plurality of unrelated customer companies.

It is a further advantage of the invention that there is provided a system and method for providing procurement services to a plurality of companies organized according to groups of related companies sharing access to selected resources across company groups and access to other resources only within company groups.

It is a further advantage of the invention that there is provided a system and method for leveraging purchasing across company groups while isolating information to individual company groups.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Java Script, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for providing procurement services to a plurality of customer companies with complex accounting rules while providing secure information viewing in support of said customer companies, said customer companies being organized in a plurality of customer company groups and procurement coalitions for volume discounts and access to shared contracts with respect to a plurality of vendors, with procurement contracts leveraged across company groups, comprising the steps of:

providing a front end requisition and catalog server for providing a user interface to a user at a customer company browser to access catalogs and commodities managed by said enterprise and for providing approval notices and receiving approve/reject data with respect to customer approvers;

inputs to said front end requisition and catalog server from an enterprise procurement services system including requisition status, purchase order status and contracts, cost centers, currency exchange rates, general ledger accounts, purchase order history invoices, purchase order history receipts, and confirmations; outputs from said requisition and catalog server to said procurement services system including requisitions and positive confirmation responses;

inputs to said front end requisition and catalog server from said customer company browser including submit requisition; outputs from said requisition and catalog server to said customer company browser including approval/rejection notices, status display, and negative and positive confirmations; with notice and response data being exchanged between said requisition and catalog server and browser;

inputs to said front end requisition and catalog server from a vendor system including vendor catalogs via an enterprise electronic data interchange application;

inputs to said front end requisition and catalog server from an enterprise requisition and catalog system including postal code validation data;

inputs to said front end requisition and catalog server including human resource extract data from an enterprise hub server;

providing said enterprise procurement services system managed by said enterprise for accepting requisitions from said front end requisition and catalog server entered by said user and responsive thereto for causing said electronic data interchange application to generate transactions to said vendors and for generating accounting transactions to a leveraged procurement network data warehouse facility for said requisitions;

inputs to said enterprise procurement services system from said front end requisition and catalog server including requisitions and positive confirmation responses; and outputs to said front end requisition and catalog server from said enterprise procurement services system including requisition status data, purchase order status and contracts data, cost center data, currency exchange rates, general ledger accounts, purchase order history invoices purchase order history receipts, and order confirmations;

inputs to said enterprise procurement services system from said enterprise hub server including cost center data; and outputs to said hub server from said enterprise procurement services system including a company process control table, vendor master updates, and accounting detail;

inputs to said enterprise procurement services system from said electronic data interchange application including purchase order acknowledgments, invoices, payment status and file transfer check reconstructions; and outputs from said enterprise procurement services system to said electronic data interchange application including purchase orders, invoice rejections and payments;

inputs to said enterprise procurement services system from operator terminals including process purchase orders, requests for quotes, and contracts data, create/change vendor master data, invoice processing; payment proposal data, and payment post and print;

inputs to said enterprise procurement services system including currency exchange rate data from an external financial services server; and output from said enterprise procurement services system to vendors including paper and fax purchase order documents;

inputs to said enterprise electronic data interchange application from said vendor including purchase acknowledgments and invoices, and outputs from said electronic data interchange application to said vendor including purchase orders and invoice rejections;

inputs to said enterprise electronic data interchange application including payments from a payment source and outputs from said enterprise electronic data interchange application including payments to customer electronic data interchange applications;

providing said leveraged procurement network hosted data warehouse facility for storing and monitoring said electronic data interchange transactions and accounting transactions;

providing said enterprise hub server for transferring data between said front end requisition and catalog server, said back-end purchasing system, and said data warehouse facility;

inputs to said enterprise procurement services hub server from said enterprise procurement services system including company process control table, vendor master updates and accounting detail;

outputs from said enterprise procurement services hub server including human resource extract data, extracted from customer employee data, to customer requisition and catalog system;

outputs from said enterprise procurement services hub server to a customer back-end purchasing system including vendor master data, invoice detail, payment detail and bank clearing detail data;

inputs to said enterprise procurement services hub server further including cost centers data;

said customer back-end purchasing system also receiving goods receipts from customer receiving;

establishing in a computer database a user profile for associating acceptable accounting and system controls to each person authorized by a customer company to access said procurement services;

associating each said company with a company group of related companies;

providing common code defining workflow components common to all companies within said company group, including accounting validation and approval processing;

specifying in said user profile for each said user a user company and company group so as to define said controls based on company and company group by collecting in said user profile each of a plurality, of users into a user profile table associating acceptable accounting and system controls for each person authorized by a customer company to access procurement services for leveraging access and maintaining isolation of data by identifying a user at log on as associated with a particular company group;

providing in a hub server a company group human resources file connected through a fire wall to a requisition and catalog server for creating and maintaining said user profile table;

said procurement services including process requirements and data resources accessible only to those users identified in their profiles as members of a particular company and, therefore, company group and including catalogs, contracts, cost centers defining departments that can be charged, a chart of accounts defining general ledger account codes, entries in said user profile table, business rules and defaults including those affiliated with accounting and specifying fields that must be completed in creating a requisition and default data to be entered in those fields;

providing in each entry for a user in said user profile a company group code a company code, a plant code specifying ship to location, an employee serial number, and an E-mail address;

using said company group code and said company code responsive to user login to associate said user with a given company in a company group for responsive to user selection of a shop-from-a-catalog button on a user browser, controlling catalog application code to display to said user only those catalogs for which a corresponding catalog profile includes said user's company in a resource profile;

specifying departments that can be charged across companies in a company group;

selectively allowing a user to initiate requests for other users, view general ledger account codes associated with commodity codes by company group, company group specific business rules including accounting business rule defaults specifying fields required to be filled in by said user based on item being bought;

said resource profile providing for each procurement resource to be shared among said users a computer database specifying for each resource those companies to have access to and share said procurement resource; and responsive to said user profile and said resource profiles controlling user access to said procurement resources.

2. System for providing procurement services by an enterprise to a plurality of customer companies with complex accounting rules while providing secure information viewing in support of said customer companies, said customer companies being organized in a plurality of customer company groups and procurement coalitions for volume discounts and access to shared contracts with respect to a plurality of vendors, with procurement contracts leveraged across company groups, comprising:

a front end requisition and catalog server for providing a user interface to a user at a customer company browser to access catalogs and commodities managed by said enterprise and for providing approval notices and receiving approve/reject data with respect to customer approvers;

inputs to said front end requisition and catalog server from an enterprise procurement services system including requisition status, purchase order status and contracts, cost centers, currency exchange rates, general ledger accounts, purchase order history invoices, purchase order history receipts, and confirmations; outputs from said requisition and catalog server to said procurement services system including requisitions and positive confirmation responses;

inputs to said front end requisition and catalog server from said customer company browser including submit requisition; outputs from said requisition and catalog server to said customer company browser including approval/rejection notices, status display, and negative and positive confirmations; with notice and response data being exchanged between said requisition and catalog server and browser;

inputs to said front end requisition and catalog server from a vendor system including vendor catalogs via an enterprise electronic data interchange application;

inputs to said front end requisition and catalog server from an enterprise requisition and catalog system including postal code validation data;

inputs to said front end requisition and catalog server including human resource extract data from an enterprise hub server;

said enterprise procurement services system managed by said enterprise for accepting requisitions from said front end requisition arid catalog server entered by said user and responsive thereto for causing said electronic data interchange application to generate transactions to said vendors and for generating accounting transactions to a leveraged procurement network data warehouse facility for said requisitions;

inputs to said enterprise procurement services system from said front end requisition and catalog server including requisitions and positive confirmation responses; and outputs to said front end requisition and catalog server from said enterprise procurement services system including requisition status data, purchase order status and contracts data, cost center data, currency exchange rates, general ledger accounts, purchase order history invoices, purchase order history receipts, and order confirmations;

inputs to said enterprise procurement services system from said enterprise hub server including cost center data, and outputs to said hub server from said enterprise procurement services system including a company process control table, vendor master updates, and accounting detail;

inputs to said enterprise procurement services system from said electronic data interchange application including purchase order acknowledgments, invoices, payment status and file transfer check reconstructions; and outputs from said enterprise procurement services system to said electronic data interchange application including purchase orders invoice rejections and payments;

inputs to said enterprise procurement services system from operator terminals including process purchase orders, requests for quotes, and contracts data, create/change vendor master data, invoice processing, payment proposal data, and payment post and print;

inputs to said enterprise procurement services system including currency exchange rate data from an external financial services server; and output from said enterprise procurement services system to vendors including paper and fax purchase order documents;

inputs to said enterprise electronic data interchange application from said vendor including purchase acknowledgments and invoices, and outputs from said electronic data interchange application to said vendor including purchase orders and invoice rejections;

inputs to said enterprise electronic data interchange application including payments from a payment source and outputs from said enterprise electronic data interchange application including payments to customer electronic data interchange applications;

said leveraged procurement network hosted data warehouse facility for storing and monitoring said electronic data interchange transactions and accounting transactions;

said enterprise hub server for transferring data between said front end requisition and catalog server, said back-end purchasing system, and said data warehouse facility;

inputs to said enterprise procurement services hub server from said enterprise procurement services system including company process control table, vendor master updates and accounting detail;

outputs from said enterprise procurement services hub server including human resource extract data, extracted from customer employee data, to customer requisition and catalog system;

outputs from said enterprise procurement services hub server to a customer back-end purchasing system including vendor master data, invoice detail, payment detail and bank clearing detail data;

inputs to said enterprise procurement services hub server further including cost centers data;

said customer back-end purchasing system also receiving goods receipts from customer receiving;

said requisition and catalog server including a user profile table, a company group human resources file, a new employee profile build application, a table build application and a plurality of procurement resources;

said user profile table associating acceptable accounting and system controls for each person authorized by a customer company to access said procurement services for leveraging access and maintaining isolation of data by identifying a user at log on as associated with a particular company group;

said hub server including a company group human resources file connected through a fire wall to said requisition and catalog server for creating and maintaining said user profile table;

said procurement resources including process requirements and data resources accessible only to those users identified in their profiles as members of a particular company and, therefore, company group and including catalogs, contracts, cost centers defining departments that can be charged, a chart of accounts defining general ledger account codes, entries in said user profile table, business rules and defaults including those affiliated with accounting and specifying fields that must be completed in creating a requisition and default data to be entered in those fields;

each entry for a user in said user profile including company group code, company code, plant code specifying ship to location employee serial number, and E-mail address;

said company group code and said company code being operable responsive to user login to associate said user with a given company in a company group, thereby responsive to user selection of a shop-from-a-catalog button on a user browser controlling catalog application code to display to said user only those catalogs for which a corresponding catalog profile includes said user's company in a resource profile;

specifying departments that can be charged across companies in a company group;

selectively allowing a user to initiate requests for other users, view general ledger account codes associated with commodity codes by company group, company group specific business rules including accounting business rule defaults specifying fields required to be filled in by said user based on item being bought;

each said company associated with a company group of related companies;

common code defining work low components common to all companies within said company group, including accounting validation and approval processing;

said user profile specifying for each said user a user company and company group so as to define said controls based on company and company group; a resource profile provided for each said procurement resource, each entry in said resource profile including a resource identifier and specifying companies to have access to and share said procurement resource; and said user profile and said resource profiles for controlling user access to said procurement resources.

* * * * *